United States Patent [19]
Furman et al.

[11] Patent Number: 6,049,594
[45] Date of Patent: Apr. 11, 2000

[54] AUTOMATIC VOCABULARY GENERATION FOR TELECOMMUNICATIONS NETWORK-BASED VOICE-DIALING

[75] Inventors: Daniel Selig Furman, Summit; Daniel Jitzchak Mayer, Warren, both of N.J.; Dennis James Morgan, Gahanna; Glen Alan Taylor, Columbus, both of Ohio

[73] Assignee: AT&T Corp, New York, N.Y.

[21] Appl. No.: 08/899,789

[22] Filed: Jul. 24, 1997

Related U.S. Application Data

[63] Continuation of application No. 08/559,900, Nov. 17, 1995, abandoned.

[51] Int. Cl.[7] ................. H04M 1/64; H04M 11/00; H04M 7/00
[52] U.S. Cl. ................. 379/67.1; 379/88.03; 379/88.16; 379/93.03; 379/223
[58] Field of Search ................. 379/67.1, 71, 83, 379/88.01, 88.02, 88.07, 88.16, 91.01, 201, 80, 88.03, 88.04, 93.03, 93.12, 223, 263

[56] References Cited

U.S. PATENT DOCUMENTS

| | | | |
|---|---|---|---|
| Re. 32,012 | 10/1985 | Pirz et al. | 395/2.84 |
| 4,191,860 | 3/1980 | Weber | 379/115 |
| 4,351,984 | 9/1982 | Young et al. | 379/126 |
| 4,587,670 | 5/1986 | Levinson et al. | 395/2.65 |
| 4,783,804 | 11/1988 | Juang et al. | 395/2.54 |
| 5,181,237 | 1/1993 | Dowden et al. | 379/88 |
| 5,218,632 | 6/1993 | Cool | 379/126 |
| 5,325,421 | 6/1994 | Hou et al. | 379/67 |
| 5,353,336 | 10/1994 | Hou et al. | 379/67 |
| 5,392,357 | 2/1995 | Bulfer et al. | 380/33 |
| 5,465,291 | 11/1995 | Barrus et al. | 379/67 |
| 5,488,652 | 1/1996 | Bielby et al. | 379/88 |
| 5,557,658 | 9/1996 | Gregorek et al. | 379/67 |
| 5,563,933 | 10/1996 | August et al. | 379/115 |
| 5,568,546 | 10/1996 | Marutiak | 379/357 |
| 5,592,546 | 1/1997 | Takahashi | 379/355 |
| 5,627,887 | 5/1997 | Freedman | 379/144 |
| 5,638,425 | 6/1997 | Meador, III et al. | 379/88 |
| 5,684,872 | 11/1997 | Flockhart et al. | 379/266 |

OTHER PUBLICATIONS

Rabiner, L.R. et al., "A Voice–Controlled, Repertory–Dialer System", *The Bell System Technical Journal*, vol. 59, No. 7, Sep. 1980, pp. 1153–1163.

Church, K., "Stress Assignment in Letter to Sound Rules for Speech Synthesis," *ICASSP Proc.* (1986), pp. 2423–2426.

*Primary Examiner*—Fan S. Tsang
*Assistant Examiner*—Allan Hoosain

[57] ABSTRACT

A technique for creating, training, and using a telecommunication network-based automatic voice-dialing system is provided through the automatic determination, by a network element, of likely called parties for a given customer. This determination is made based on records of network usage by the customer. Names of the likely called parties are determined through the use of, e.g., a conventional reverse telephone directory database.

41 Claims, 8 Drawing Sheets

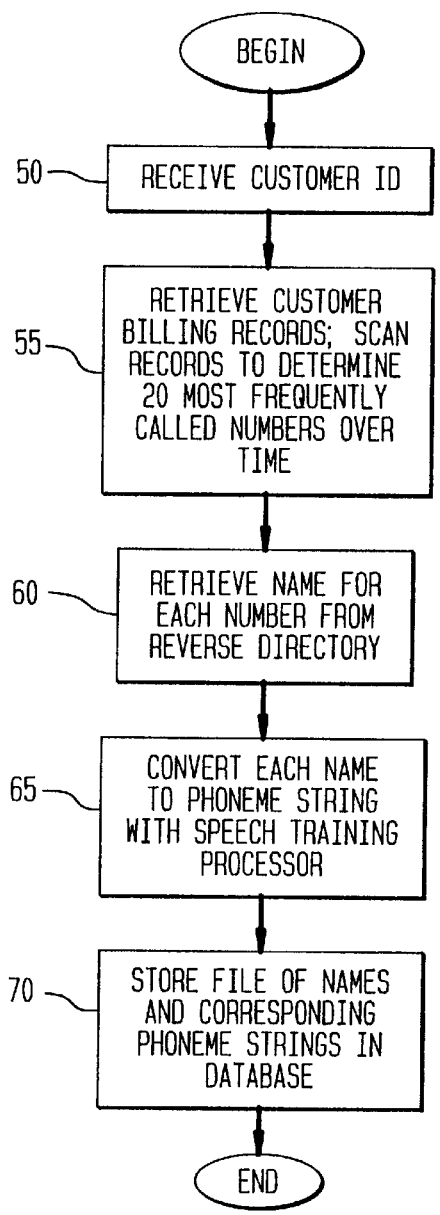

FIG. 7

CUSTOMER ID

| CALLED NO 1 | PHONEMIC TRANSL. (SPOKEN NAME 1) |
| CALLED NO 2 | PHONEMIC TRANSL. (SPOKEN NAME 2) |
| ⋮ | ⋮ |
| CALLED NO N | PHONEMIC TRANSL. (SPOKEN NAME N) |

FIG. 9

CUSTOMER ID

| CALLED NO 1 | RECOGNITION Hmm (1) |
| CALLED NO 2 | RECOGNITION Hmm (2) |
| ⋮ | ⋮ |
| CALLED NO N | RECOGNITION Hmm (N) |

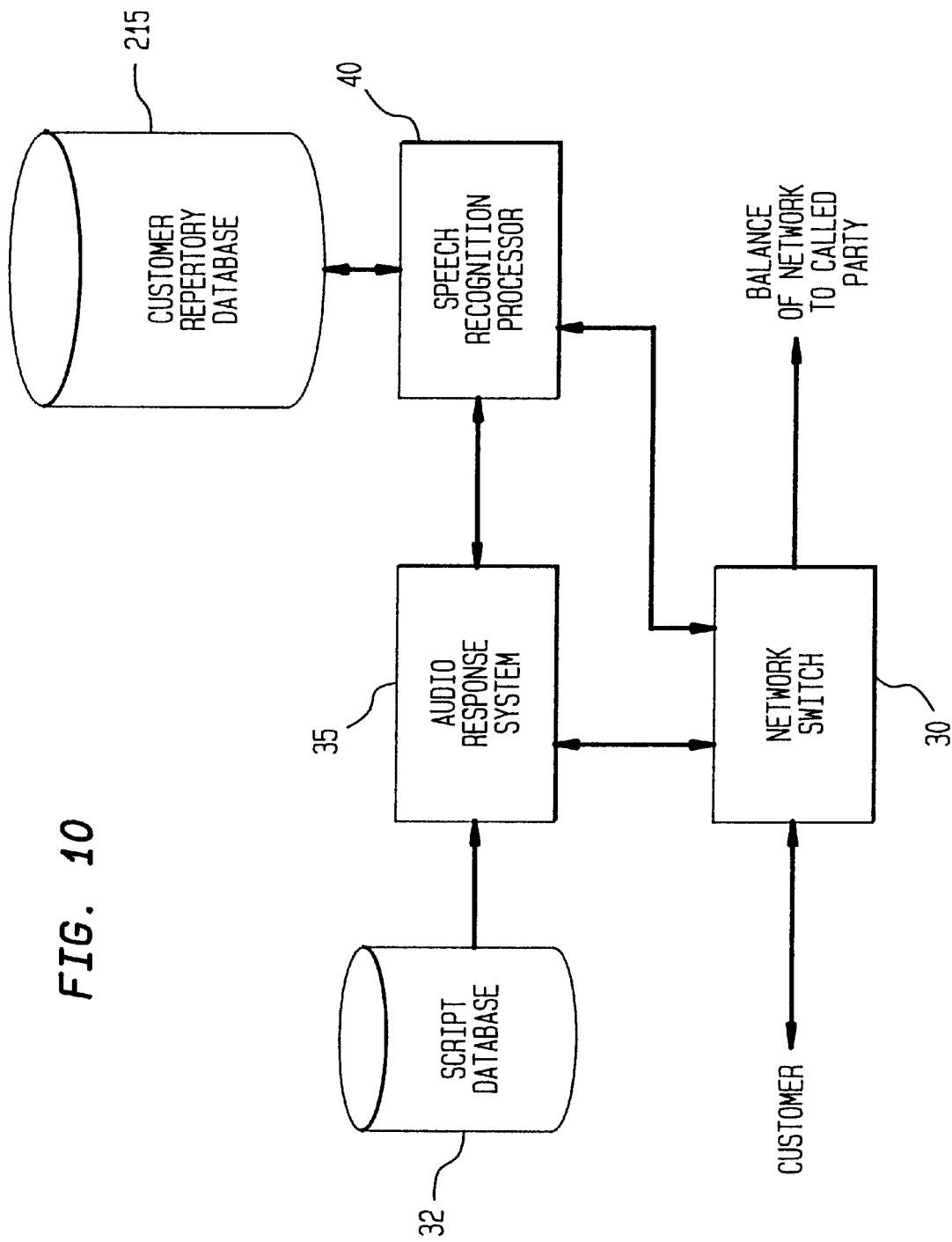

AUTOMATIC VOCABULARY GENERATION FOR TELECOMMUNICATIONS NETWORK-BASED VOICE-DIALING

This is a Continuation of application Ser. No. 08/559,900 filed Nov. 17, 1995, now abandoned.

FIELD OF THE INVENTION

The present invention relates generally to speech recognition-based telecommunications services, and more particularly to training techniques for such services.

BACKGROUND OF THE INVENTION

Speech recognition for use in repertory dialing of telephone numbers is a well-known concept. See Rabiner et al., "A Voice Controlled Repertory Dialer System," Vol. 59, No. 7, *The Bell System Technical Journal*, p. 1153 (1980). The basic notion is that a speech recognition system may be trained to recognize, among other things, names of people that a telephone user may wish to "dial." The recognizer has a memory which includes speech recognition models (such as, for example, conventional hidden Markov models (HMMs) or templates) of the names of persons which are likely to be spoken for dialing. This memory is referred to as the recognizer "vocabulary." Associated with each model is a telephone number to be dialed. When a user speaks a name in the vocabulary, the recognizer recognizes the name and causes an automatic dialer to generate signals, such as conventional DTMF signals, which initiate a telephone call to the person whose name was recognized.

Speech recognition for automatic repertory dialing has been applied in both the telephone and telephone network contexts. In the telephone context, the recognizer/dialer system replaces the use of the DTMF keypad for those names in the vocabulary. See, e.g., U.S. Pat. No. Re. 32,012, entitled "Spoken Word Controlled Automatic Dialer," which is incorporated by reference as if set forth herein. Such a telephone can be used with a completely conventional public switched telephone network, such as the AT&T network, which receives DTMF signals and establishes a connection between the calling and called parties. The network makes no distinction between DTMF tones generated by a person (as in conventional manual dialing) and those generated automatically as a result of speech recognition.

In the network context, a special network node (or switch) is deployed in the telephone network for performing the functions of speech recognition and control signal generation. A network service customer (subscriber) accesses the node either at dial tone or as a result of dialing a special node access number, such as *96 or a "1-800" number. The subscriber speaks the name he desires to call and the node performs the recognition task. In response to recognizing a spoken name, control signals are generated by the node to complete the call to the called party.

In both the telephone and telephone network contexts, the user must supply the automatic dialer with the list of names and corresponding numbers which the user (or subscriber) wishes to be able to "dial" by voice. This supply process is cumbersome and requires the user to determine for himself the list of names and numbers which would be most convenient to include in his repertory dialing vocabulary.

SUMMARY OF THE INVENTION

The present invention is directed to a technique for creating, training, and using a telecommunication network-based automatic voice-dialing system. The technique involves the automatic determination, by a network element, of likely called parties for a given customer, based on records of network usage by the customer. Names of the likely called parties are determined through the use of, e.g., a conventional reverse telephone directory database.

Although the concepts of the present invention are illustrated with reference to a telephone network, the concepts are equally applicable to other types of networks such as, for example, the Internet, ATM networks, wireless networks, etc., where a customer's network usage records are available. In such cases, network addresses with which communication has been established, according to these records, may be associated with a corresponding speakable label such that, with conventional speech recognition techniques, a customer may initiate a connection to such address over the network by speaking the label.

BRIEF DESCRIPTION OF THE DRAWINGS

FIG. 3 presents a flow chart of the operations of the database processor of FIG. 2.

FIG. 4 presents a schematic representation of an entry in the customer repertory database of FIG. 2.

FIG. 7 presents a schematic representation of an entry in the customer repertory database of FIG. 6 including speaker-dependent phonemic translations of spoken words.

FIG. 9 presents a schematic representation of an entry in the customer repertory database of FIG. 8 including speaker-dependent HMMs.

FIG. 10 presents telecommunication network components, located illustratively at the special service node of FIG. 1, suitable for providing repertory voice-dialing in accordance with the embodiment presented in FIGS. 8 and 9.

DETAILED DESCRIPTION

A. Introduction to the Illustrative Embodiments

The illustrative embodiments of the present invention discussed below each contain two distinct systems: a training system and a dialing system. Among other things, the training system determines what are the most frequently dialed numbers for a given customer and associates such numbers with names for storage in a customer repertory database. The dialing system makes use of the information provided to the customer repertory database by the training system to facilitate the completion of telephone calls.

The first embodiment of the present invention employs speaker-independent speech recognition technology of the type well-known in the art. Besides determining the most frequently dialed numbers for a customer, the training system of this embodiment also functions to determine basic speech recognition information necessary to recognition of names of parties to be "dialed." In this case, the system determines a phonemic translation of called party names. Because of the speaker independent nature of the first embodiment, there is no requirement that the customers be contacted prior to the time when the voice dialing service is scheduled to be offered.

The second and third illustrative embodiments of the present invention employ different versions of speaker-dependent speech recognition, also well-known in the art. The second embodiment is speaker-dependent in that it determines, for each name in the customer's voice-dialing vocabulary, a sequence of phonemes as spoken by the customer corresponding to such names. The models used by the second embodiment to recognize spoken names are themselves speaker-independently trained.

The third illustrative embodiment is speaker-dependent in that it employs speech models which are trained by the customer using the voice-dialing service.

The descriptions of the illustrative embodiments do not focus on the details of conventional telephone network architecture familiar to those of ordinary skill in the art. This has been done so as not to obscure the presentation of the invention. Such details are discussed in many patents and publications including U.S. Pat. Nos. 5,392,357 and 4,191,860, which are incorporated by reference as if fully set-forth herein. For the convenience of the reader, a brief discussion of illustrative architectural elements will now be presented.

Figure 1:
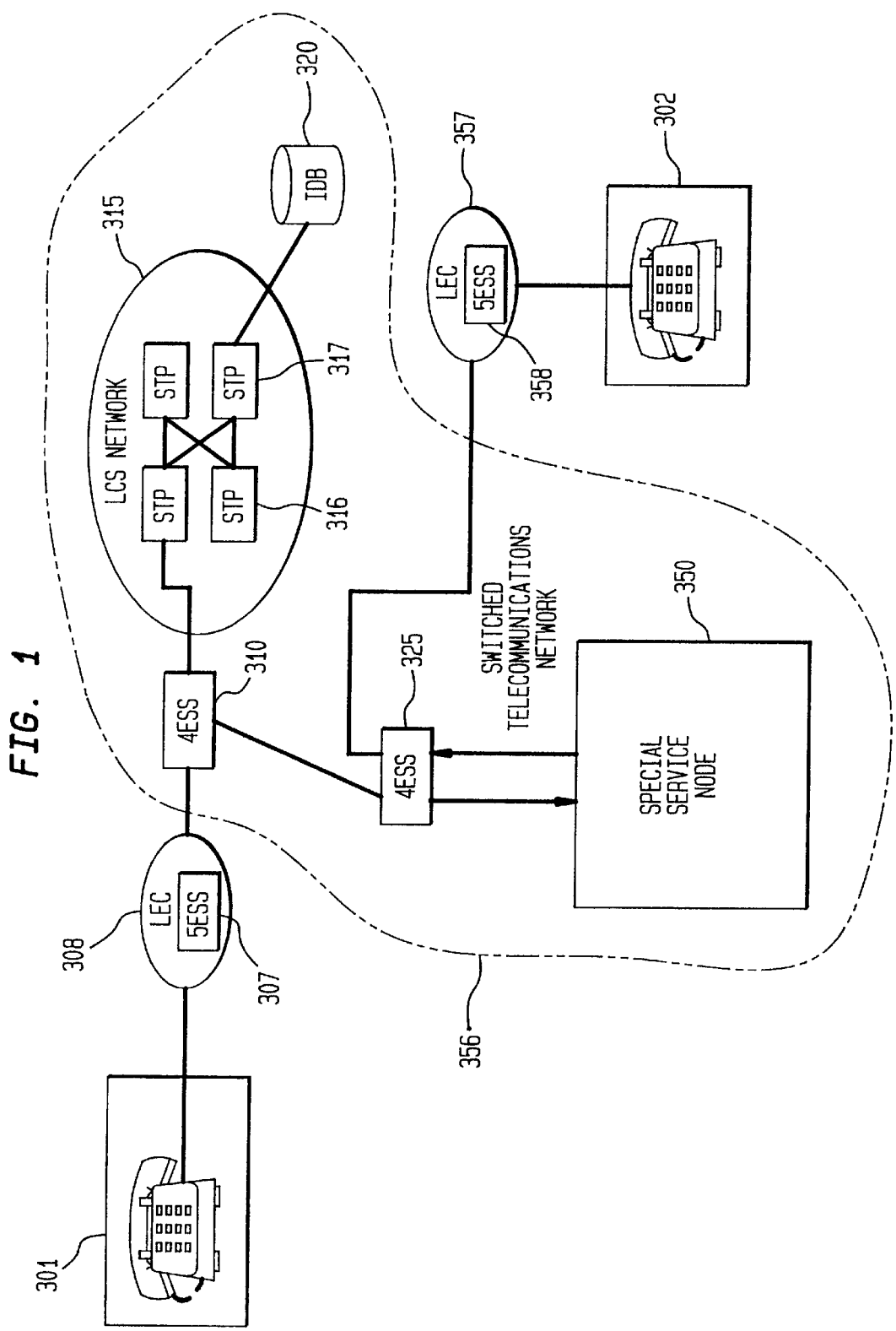
FIG. 1 presents an illustrative network architecture for routing calls to an illustrative embodiment of the present invention.

Referring to FIG. 1, communications originated by a calling party using near side customer equipment (CE) 301 are destined for a called party using far side CE 302, and vice versa. As used herein, "communications" may include analog or digital calls or messages that convey voice, data, facsimile, video or other information. Hereinafter, communications may be referred to simply as "calls."

For convenient data entry, CE 301 may be equipped with a DTMF (touch-tone) generator and a keypad; status indications can be given to the user through one or more display indicators, such as LED display lamps. While CE 301, 302 may be any of a number of communications devices, including cellular phones, facsimile machines, PCs equipped with communications hardware/software, etc., for the illustrative purposes of the immediately following description, it is assumed that CE 301, 302 are conventional telephones.

While telecommunications "access" to special service node 350 can be gained by any convenient access mechanism, such as by using (a) a software defined network (SDI) access number; or (b) a POTS (plain old telephone service) number in conjunction with a premium service such as MEGACOM available from AT&T; or (c) an 800 number, it is assumed, for illustrative purposes, that a calling party using CE 301 gains access to node 350 by dialing a predetermined toll-free number, such as 1-800-SERVICE.

When that number is dialed, the call is routed by a switch 307 (e.g., a #5ESS® electronic switch from AT&T) in a local exchange carrier (LEC) office 308 serving the calling party. The calling party may be connected directly to LEC office 308 and switch 307, as shown in FIG. 1, or connected via a PBX switch or other customer premises equipment, not shown. Switch 307 routes the call to an interexchange carrier switch 310, typically an AT&T #4ESS Access Control Point (ACP) that is part of a switched telecommunications network that is designated generally as 356. Switch 310 responds by generating a signaling message (usually in the well-known CCS7 signaling format) and routing it through a common channel signaling (CCS) network 315 including a plurality of interconnected Signal Transfer Points (STPs) 316, 317, to an InWATS Data Base (IDB) 320, or to a network control point (NCP) in a software defined network, depending upon the subscription plan of the calling party. IDB 320 contains records for each dialed 800 number, and performs a look-up operation in order to generate a routing number associated with the dialed number, which is sent back to switch 310.

In response to the routing number, switch 310 in turn routes the call to special service node 350, usually through other components of switched telecommunications network 356, which may include another #4ESS switch 325 (it should be understood that other access and signaling arrangements may be used to interconnect CE 301 with special service node 350).

When the call is received in the special service node 350, the node may also receive from switch 307, 310 or 325, a CCS message containing the dialed number (DNIS) and automatic number identification (ANI) information corresponding to CE 301. However, the availability of such information depends upon the capabilities of the specific switches and signaling equipment being used by LEC office 308 and network 356. For the purposes of the following explanation, it will be assumed that calling party information is available to the special service node 350.

Once the call is processed by the special service node (which illustratively includes both training and voice-dialing systems), the call may be routed conventionally (if voice-dialing is being performed), based on a telephone number determined by node 350 in accordance with the present invention, through the switched telecommunications network 356 to the LEC 357 serving the called party. Switch 358 (again, e.g., a #5ESS® electronic switch available from AT&T) in turn routes the call to the CE 302 of the called party.

While in the illustrative embodiments the training and dialing functions are done by a given network node 350, one or both of such tasks would be done by any suitable network element, where the term "element" is used generally to refer to a functional component of the particular network in question (such as those networks referenced above).

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIGS. 2, 5, 6, 8 and 10 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

B. The First Illustrative Embodiment

1. Training the Speaker-Independent Network-Based Voice-Dialing System

Figure 2:
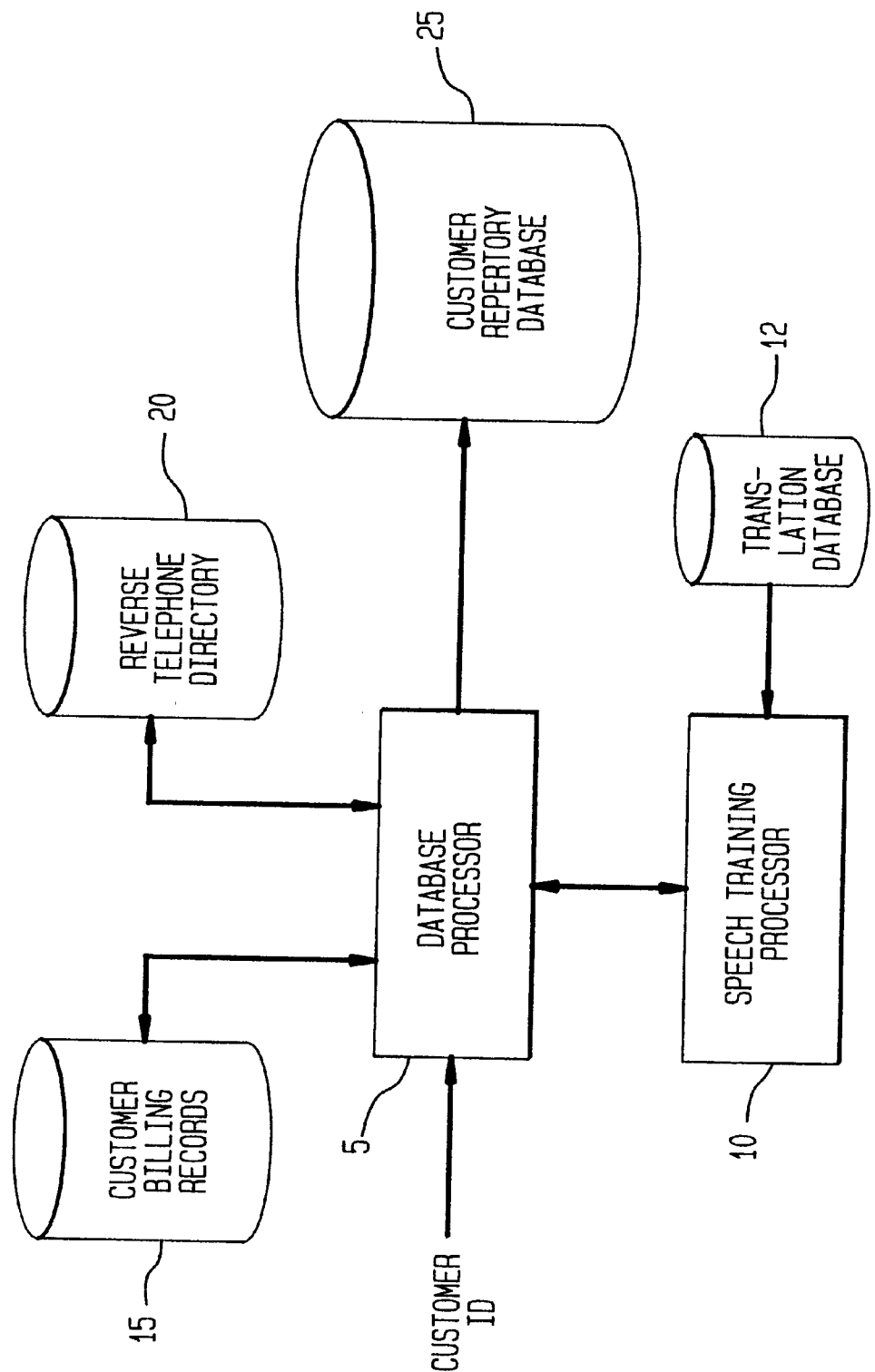
FIG. 2 presents an illustrative system for generating a customer repertory database based on speaker-independent models in accordance with the present invention.

FIG. 2 presents an illustrative system for generating a customer repertory database based on speaker-independent acoustic models in accordance with the present invention. The illustrative system resides in a telecommunication network as an adjunct to, for example, a network switch. The illustrative system may be deployed in a local telephone service provider network, or in a long distance network. The system of FIG. 2 comprises a database processor 5, a customer billing records database 15, a reverse telephone directory database 20, a speech training processor 10, a phonemic translation database 12, and a customer repertory database 25. The operation of the system of FIG. 2 can be readily understood from a flow chart of database processor 5 operation presented in FIG. 3.

To generate a repertory dialer database for a given network customer, a customer's ID number is required. This number is obtained from a conventional network customer database (not shown). The customer ID number could be, for example, a customer's telephone number, or any other code which the service provider uses to identify its customers. The ID number is supplied to database processor 5, which is implemented on conventional computer hardware. See step 50 of FIG. 3.

Database processor 5 then uses the customer ID number to index the customer billing record database 15 to determine the telephone numbers most frequently dialed by the customer over a given period of time, such as the last six months of customer service usage. This determination is made by keeping a count of the number of times a call is placed to a given called number. Database 15 is conventional and is illustratively the type normally maintained by local and/or long distance telephone service providers for billing purposes. In accordance with the illustrative embodiment, the database processor identifies the 20 most frequently called numbers by the given customer. See step 55 of FIG. 3.

Next, processor 5 identifies the name of the called party for each of the 20 most frequently called numbers. This is done by scanning the reverse telephone number directory database 20 using each given number as an index to determine the name associated with each number. This database 20 is conventional in the art. The name of each called party is retrieved by processor 5 as a text string (e.g., ASCII characters) for subsequent processing. Processor 5 associates each such text string with the corresponding telephone number used to access the string in the directory 20. See step 60 of FIG. 3.

Under certain circumstances, the reverse telephone directory database 20 may not contain a name for a given called party, such as when the called party number is unlisted or when the called party number is that of a business. Under such circumstances, special remedial action may be employed, such as the called number being eliminated from customer repertory database 25 storage.

Once text strings and corresponding telephone numbers have been assembled by processor 5, each text string is supplied to speech training processor 10 for translation (conversion) into a sequence of phonemes. See step 65 of FIG. 3. This conversion is done by processor 10 in combination with database 12 in conventional fashion by well-known techniques employed by text-to-speech systems for the pronunciation of proper names (data base 12 stores information suitable for mapping text to phonemes). These techniques include the use of a name-to-phoneme dictionary, as well as text-to-sound rules which differ as a function of name origin. See, e.g., Church, K., "Stress Assignment in Letter to Sound Rules for Speech Synthesis," ICASSP Proceedings (1986), pp. 2423–26. The result is a list (or sequence) of phonemes corresponding to each text string (i.e., name). Assuming a conventional number of phonemes for the language in use, for example, 50, each sequence of phonemes comprises a sequence of index numbers. Each index number has a value between 1 and 50, inclusive, identifying a specific phoneme. Each list of phonemes for a given name is returned to the database processor 5 by the speech training processor 10 for association with its corresponding telephone number.

Each telephone number and associated sequence of phonemes is then stored in customer repertory database 25 (while this database may be implemented with use of a disk drive, other storage media can be used, including, e.g., semiconductor memory and optical media). See step 70 in FIG. 3. In the illustrative example, there are 20 numbers and associated phoneme sequences. These 20 numbers and phoneme sequences form a file in database 25 which is associated with the corresponding customer ID number (which gave rise to the 20 numbers, as discussed above). An example of such a file is presented in FIG. 3. This file is then suitable for use by the telecommunication network-based repertory voice-dialing system to recognize spoken names and dial associated numbers, such as that presented in FIG. 5.

2. The Network-Based Repertory Voice-Dialing System

Figure 5:
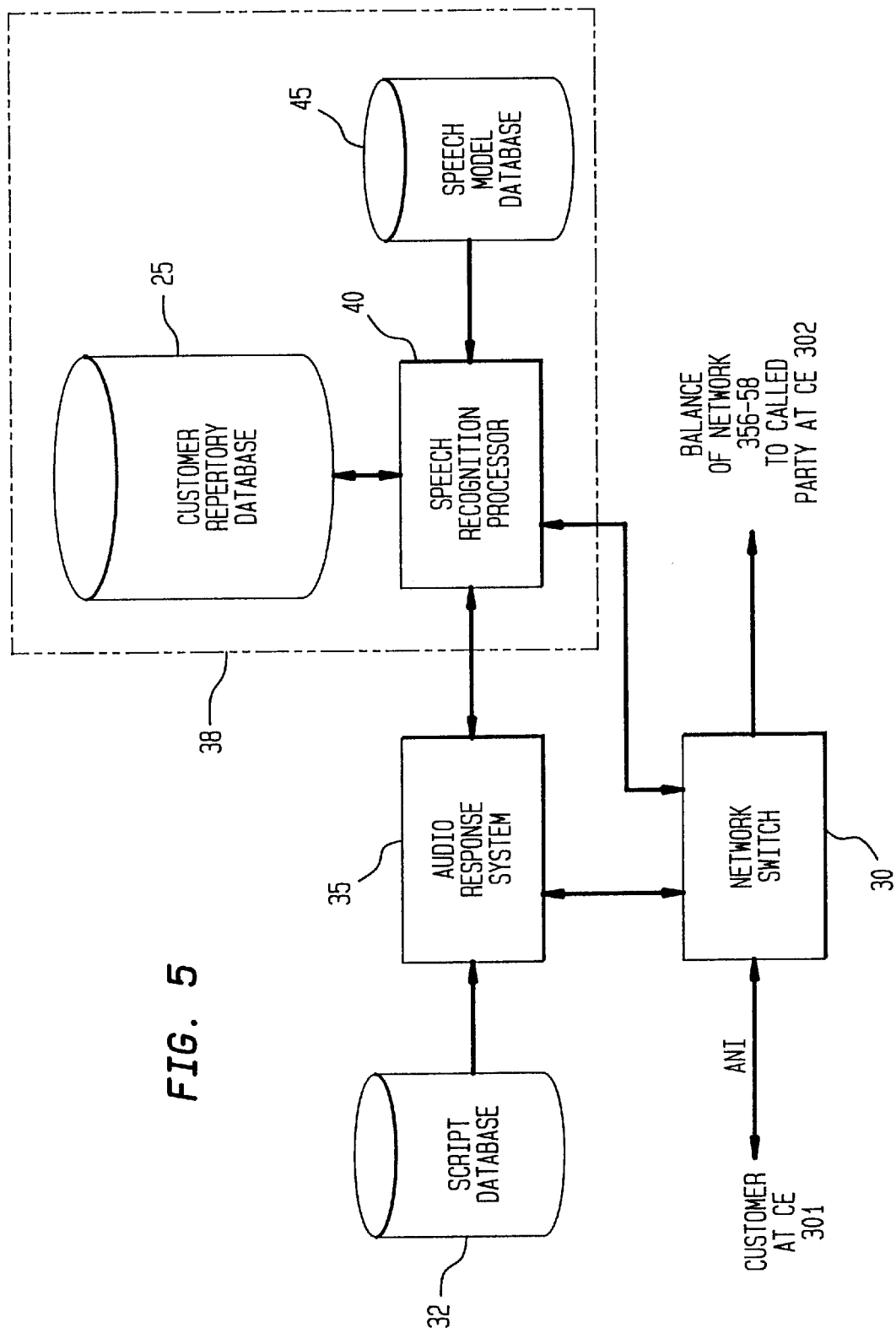
FIG. 5 presents telecommunication network components, located illustratively at the special service node of FIG. 1, suitable for providing repertory voice-dialing in accordance with the present invention.

The voice-dialing system of the first illustrative embodiment is presented in FIG. 5. The system, which resides illustratively at special service node 350, incorporates a speaker-independent speech recognition system 38 which comprises a speech recognition processor 40, a database 45 of speaker-independently trained HMMs representing phonemes, and a vocabulary in the form of the customer repertory database 25 (discussed above). The system of FIG. 5 also includes a conventional audio response system 35 and associated script database 32 (such as a Conversant System available from AT&T) coupled to both a network switching system 30 and the speech recognition processor 40.

The operation of the system of FIG. 5 begins with the reception at switch 30 of a call from a given customer (or a connection with the customer at the point when the customer receives a dial-tone, either of which hereafter referred to as the "call"). The call is routed to the system of FIG. 5 in conventional fashion by the telephone network serving the customer, as discussed above. This routing may be facilitated by the customer dialing a special number (such as an 800 number or a code comprising one or more DTMF "touch-tones") which the service provider network uses to route the call to the switch 30 at node 350. If automatic number identification (ANI) service is available, the switch 30 stores the calling customer's number (the "ANI") in its memory.

In response to the receipt of the call, the switch 30 connects the call to the audio response system 35. System 35 plays an audio greeting and/or instructions to the customer (calling party) based on the script contained in the script database 32. If no ANI is available to identify the customer, the customer is prompted by the audio response system 35 to identify himself by entering an ID code, which may be the customer's telephone number. Whether through ANI or through action of the customer identifying himself, the identification of the customer is passed to speech recognition processor 40 where it is stored (hereafter, ANI will be assumed, but it will be understood that caller identification may be accomplished in an alternative fashion, such as that described above).

Next, the customer is prompted by system 35 to speak the name of the party to be called (the called party). The spoken name is passed by the switch 30 to the speech recognition processor 40 which is prompted to expect the spoken name by system 35.

Processor 40 then operates in conventional fashion to recognize the spoken name. This operation begins with the use of the customer ANI as an index to the customer repertory database 25. Based on the ANI, the file of names and corresponding phonemic transcriptions (which were created and stored as discussed above with reference to FIG. 3) are retrieved from database 25 by the speech recognition processor 40. Processor 40 analyses the spoken name to generate a set of parameter vectors which characterize the spoken name. This analysis is done with conventional acoustic feature extraction technique, such as cepstral coefficient analysis. Processor 40 then compares the set of vectors with a sequence of phoneme HMMs from database 45. Database 45 stores an HMM for each phoneme of the language. This sequence is that sequence of HMMs specified by the first phonemic translation in the file retrieved from database 25. The comparison of the set of vectors to the sequence of phoneme HMMs yields a score which corresponds to the likelihood that the spoken name was the name associated with the first phonemic translation in the retrieved file. Next, processor 40 compares the same set of vectors with a sequence of phoneme HMMs corresponding to the second phonemic translation in the retrieved file. A score is determined for that comparison, and the process repeats until scores are determined for all phonemic translations in the retrieved file. As a result the are, for example, 20 scores associated with the 20 phonemic translations in the file. Speech recognition processor 40 then identifies the phonemic translation having the best score (i.e., the phonemic translation deemed to be the closest match with the spoken name). Based on this, processor 40 extracts the called number corresponding to the best scoring phonemic translation and provides it to the switch 30. Audio response system 35 is also informed that recognition has been accomplished such that system 35 may play the appropriate message to the calling party (in this case, e.g., "thank-you").

Switch 30, in possession of the identified number, generates appropriate call routing signals (which may include DTMF tones) to facilitate the completion of call routing to the called party (via network elements 356–58). In this fashion, the spoken name by the calling party has been used to "dial" the called party.

It will be understood that there are other possibilities which may occur when the speech recognition processor 40 attempts to recognize a spoken name. For example, no score may be of sufficiently high to allow the conclusion that the utterance spoken by the calling party corresponds to a name in the database 25. This is conventionally done by comparing the highest score to a minimum threshold for scores. When the best score does not exceed the threshold, processor 40 may inform system 35 to play an announcement to the customer requesting the customer to either (i) repeat the utterance or (ii) to begin manual dialing. Such remedial measures may also be performed when two or more scores exceed the threshold.

Also, while the above embodiment was discussed in terms of a single set of phonemes for all callers, separate phonemes may be used for male and female callers. These and other conventional issues in the science of speech recognition may be taken into account without deviating from the spirit and scope of the present invention.

C. Other Illustrative Embodiments

1. Network-Based Voice-Dialing With Speaker-Dependent Phonemic Transcription

As discussed above, the second illustrative embodiment of the present invention is speaker-dependent in that it determines, for each name in the customer's voice-dialing vocabulary, a sequence of phonemes spoken by the customer corresponding to such names. The models used by the second embodiment to recognize spoken names are themselves speaker-independently trained. The training system of the second illustrative embodiment is presented in FIG. 6.

Figure 6:
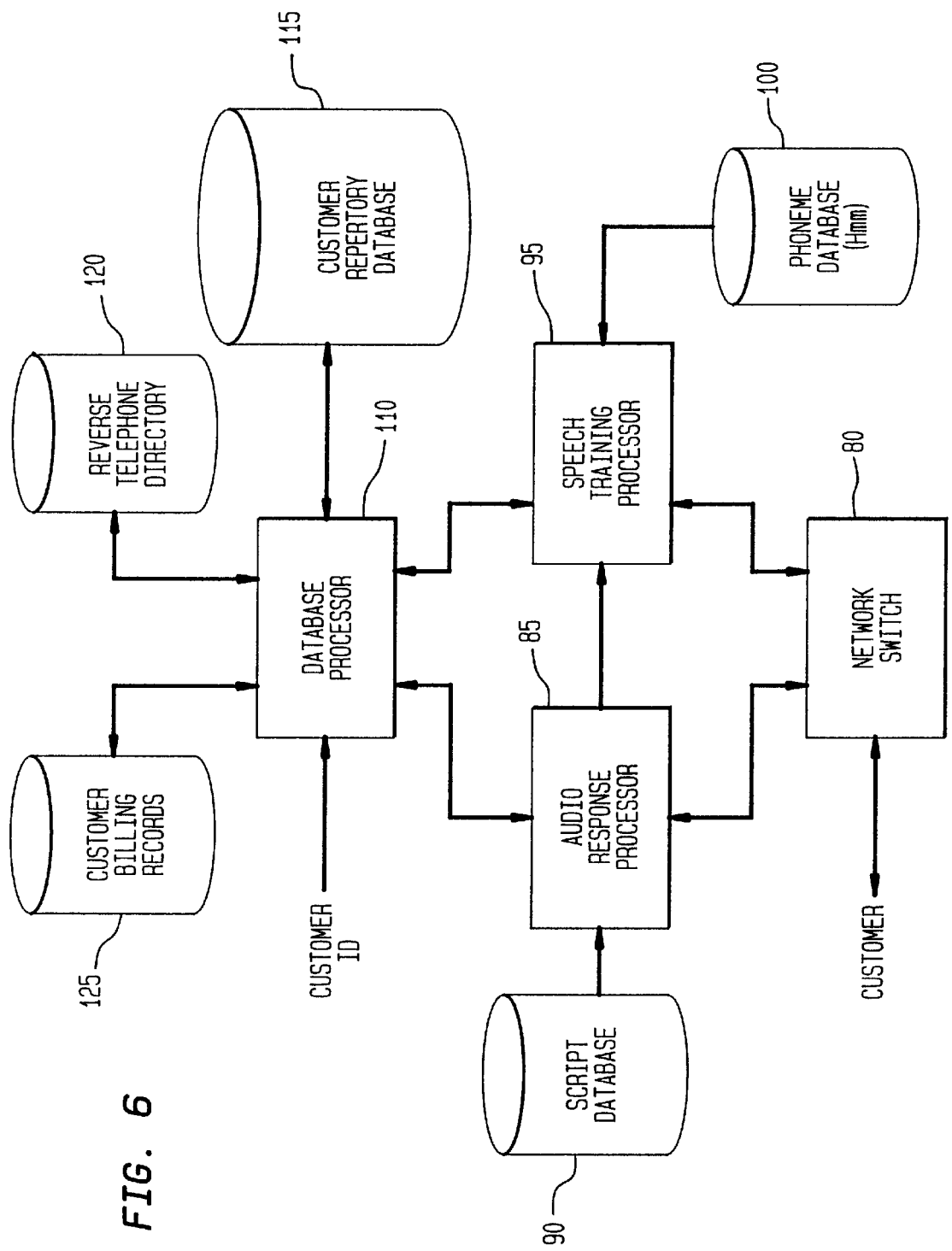
FIG. 6 presents an illustrative system for generating a customer repertory database, in accordance with the present invention, based on speech recognition employing speaker-dependent phonemic transcriptions.

The embodiment of FIG. 6 is similar to that presented in FIG. 2 in that it includes a database processor 110, coupled to a customer billing record database 125, a reverse telephone directory database 120, and a customer repertory database 115. The aim of the database processor is also similar to that shown in FIG. 2. That is, to store in the customer repertory database 115 a file which comprises a list of the most frequently dialed telephone numbers and corresponding sequences of phonemes for each desired customer. The differences between training systems of FIGS. 2 and 6 is largely due to the fact that, in the second embodiment (unlike the first), the sequences of phonemes are determined based on how a customer pronounces names of parties to be called, rather than an average pronunciation supplied by conventional text-to-phoneme conversion as practiced in the text-to-speech art. This difference between embodiments means that, with the second embodiment (unlike the first), the customer will have to be involved in the training process.

In accordance with the second embodiment, a repertory dialer database for a given network customer is generated with use of a customer's ID number. This number is obtained from a conventional network customer database (not shown). The ID number is supplied to database processor 110, which is implemented on conventional computer hardware. The customer ID number could be, for example, a customer's telephone number, or any other code which the service provider uses to identify its customers.

Database processor 110 then uses the customer ID number to index the customer billing record database 125 to determine the telephone numbers most frequently dialed by the customer over a given period of time, such as the last six months of customer service usage. This determination is made by keeping a count of the number of times a call is placed to a given called number. Database 125 is conventional to telephone service providers. As with the case with the first embodiment, a customer credit card database which includes records of telephone calls charged to the credit card could be used in addition or alternatively to the use of a conventional telephone customer billing record database. In accordance with the illustrative embodiment, the database processor identifies the 20 most frequently called numbers by the given customer.

Next, processor 110 identifies the name of the called party for each of the 20 most frequently called numbers. This is done by scanning the reverse telephone number directory database 120 using each given number as an index to determine the name associated with each number. This database 120 is conventional in the art. The name of each called party is retrieved by processor 110 as a text string (i.e., ASCII characters) for subsequent processing. Processor 110 associates each such text string with a corresponding telephone number. As with the first embodiment, there may be times when the reverse telephone directory database 20 does not contain a name for a given called party. Under such circumstances, the called number may be eliminated from customer repertory database 115 storage.

Once text strings and corresponding telephone numbers have been assembled by processor 110, each text string is supplied to speech training processor 95 for translation (conversion) into a sequence of phonemes in accordance with customer pronunciation of the names corresponding to the text strings. In order to obtain customer pronunciations of such names, the training system of FIG. 6 includes an audio response system 85 and associated script database 90 which is used to conduct an automated interview of the customer with the goal of eliciting pronunciations from the customer.

Using the customer ID (customer telephone number) received from the database processor 110, audio response processor 85 initiates a call to the customer through switch 80. When the customer answers the telephone, the system plays a message explaining the reason for the call. The script could continue by prompting the customer to speak a name which the customer would like to say when voice dialing a specific person. The prompt and response sequence would be repeated for each name in the list of most frequently called parties. Each specific called party would be identified to the customer by a text-to-speech process implemented by processor 85 based on called party name text provided by processor 110. Illustratively, the script for such prompts and corresponding responses would be:

Processor 85: "Say the name you would like to use when calling 'Daniel Furman.'"

Customer: "Dan."

Processor 85: "Say the name you would like to use when calling 'Daniel Mayer.'"

Customer: "Danny."

Under certain circumstances, the reverse telephone directory database 120 may not contain a name for a given called party, such as when the called party number is unlisted or when the called party number is that of a business. Under such circumstances, special remedial action may be employed, such as the called number being eliminated from customer repertory database 25 storage. Or, a prompt by processor 85 may speak the telephone number instead.

Each customer response to a request is passed to speech training processor 95. Speech training processor 95 performs conventional phoneme-based speech recognition on each response (using speaker-independently trained phoneme HMMs) to determine a sequence of phonemes for the response (i.e., a phonetic transcription of the response). Each such sequence of phonemes is actually a sequence of phoneme indices, identifying the individual phonemes in the sequence. Each such sequence is passed to the database processor 110 for association with the corresponding telephone number. This telephone number is that of the called party in the list (of most frequently called numbers) whose name prompted the customer response which yielded the phonetic transcription in question.

Once responses for each name in the list of names has been received, audio response processor 85 plays a call termination message and terminates the call to the customer. Database processor 110 then stores the just-compiled customer repertory vocabulary as a file in customer repertory database 115. Illustratively, the file comprises 20 numbers and associated speaker-dependent phoneme sequences and is associated with the corresponding customer ID number. An example of such a file is presented in FIG. 7. This file is then suitable for use by the telecommunication network-based repertory voice-dialing system to recognize spoken names and dial associated numbers, such as that presented in FIG. 5 and discussed above.

2. Network-Based Speaker-Dependent Voice-Dialing

As discussed above, the third illustrative embodiment of the present invention is speaker-dependent in that it employs speech models which are trained by the customer using the voice-dialing service. To train the models, the customer is asked to repeat multiple times the names he would like to use for dialing to allow HMMs of those names to be built.

Because of the relatively few names which the need to be recognized to accomplish dialing (e.g., 20 names), the speech recognition system used in the third illustrative embodiment can be whole-word based, as distinct from phoneme-based. Such whole-word based speech recognition systems, which use models of whole words, rather than shorter sounds (like phonemes), are conventional in the art. The training system of the third illustrative embodiment is presented in FIG. 8.

Figure 8:
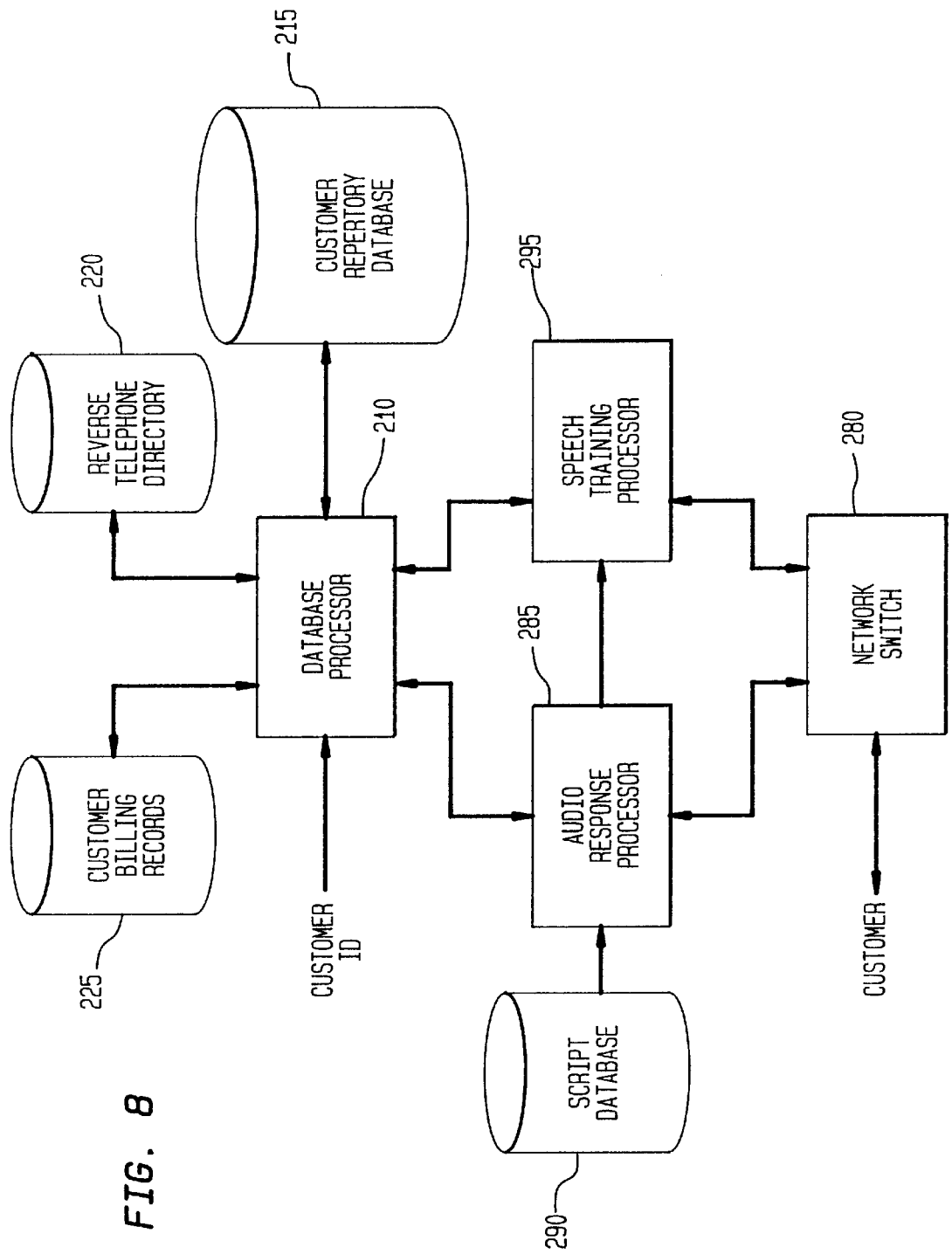
FIG. 8 presents an illustrative system for generating a customer repertory database, in accordance with the present invention, based on speaker-dependent speech recognition.

The embodiment of FIG. 8 is similar to that presented in FIG. 6 in that it includes a database processor 210, coupled to a customer billing record database 225, a reverse telephone directory database 220, and a customer repertory database 215. The aim of the database processor is also similar to that shown in FIG. 6. That is, to store in the customer repertory database 215 a file which comprises a list of the most frequently dialed telephone numbers for each desired customer. The differences between training systems of FIGS. 6 and 8 is largely due to the fact that, in the third embodiment (unlike the second), recognition is based on custom speech models of whole words, rather than average speech models of phonemes. This difference between embodiments means that, with the third embodiment, the customer will have to be more substantially involved in the training process.

In accordance with the third embodiment of FIG. 8, a repertory dialer database for a given customer is generated with use of a customer's ID number. This number is obtained from a conventional network customer database (not shown). The ID number is supplied to database processor 210, which is implemented on conventional computer hardware. As discussed above, the customer ID number could be, for example, a customer's telephone number, or any other code which the service provider uses to identify its customers.

Database processor 210 uses the customer ID number to index the customer billing record database 225 to determine the telephone numbers most frequently dialed by the customer over a given period of time, such as the last six months of customer service usage, as discussed above. Database 125 may reflect conventional telephone billing or may include credit card billing, as discussed above. In accordance with the third illustrative embodiment, the database processor 210 identifies the 20 most frequently called numbers by the given customer.

Next, processor 210 identifies the name of the called party for each of the 20 most frequently called numbers. This is done, as discussed above, by scanning the reverse telephone number directory database 220 using each given number as an index to determine the name associated with each number. The name of each called party is retrieved by processor 210 as a text string (i.e., ASCII characters) for subsequent processing. Processor 210 associates each such text string with a corresponding telephone number. As with the second embodiment, there may be times when the reverse telephone directory database 220 does not contain a name for a given called party. Under such circumstances, the called number may be eliminated from customer repertory database 215 storage.

Once text strings and corresponding telephone numbers have been assembled by processor 210, each text string is supplied to speech training processor 295 for the generation of an HMM representing a customer pronunciation of a name corresponding to the text strings. In order to obtain customer pronunciations of such names, the training system of FIG. 8 includes an audio response system 285 and associated script database 290 which is used to conduct an automated interview of the customer with the goal of eliciting name pronunciations from the customer.

Using the customer ID (customer telephone number) received from the database processor 210, audio response processor 285 initiates a call to the customer through switch 280. When the customer answers the telephone, the system plays a message explaining the reason for the call. The script continues by prompting the customer to speak and repeat a name which the customer would like to say when voice dialing a specific person. The prompt and response sequence would be repeated for each name in the list of most frequently called parties. Each specific called party would be identified to the customer by a conventional text-to-speech process implemented by processor 285 based on called party name text provided by processor 210. Illustratively, the script for such prompts and corresponding responses would be:

Processor 285: "Say the name you would like to use when calling 'Daniel Furman.'"
Customer: "Dan."
Processor 285: "Please repeat the name you would like to use when calling 'Daniel Furman.'"
Customer: "Dan."

Repetition of the name "Dan" may occur several times.

As mentioned above, under certain circumstances, the reverse telephone directory database 220 may not contain a name for a given called party, such as when the called party number is unlisted or when the called party number is that of a business. When no name is readily associated with a number. One such remedial action is to eliminate the called number from customer repertory database 115 storage. Another such remedial action involves a prompt by processor 285 to the customer. Such a prompt might ask the customer to speak the telephone number. In such case, the number would be treated as a whole word for purposes of building an HMM. Alternatively, processor 285 could prompt the customer to provide a name to be used when dialing the number (see above), and a model for the name could therefore be built.

Each customer response to a request is passed to speech training processor 295. Speech training processor 295 performs a conventional HMM building process using the responses. See, e.g., U.S. Pat. Nos. 4,587,670 and 4,783,804, which are incorporated by reference as if fully set forth herein. Each such HMM is passed to the database processor 210 for association with the corresponding telephone number. This telephone number is that of the called party in the list (of most frequently called numbers) whose name prompted the customer response which yielded the HMM in question.

Once responses for each name in the list of names has been received, audio response processor 285 plays a call termination message and terminates the call to the customer. Database processor 210 then stores the just-compiled customer repertory vocabulary as a file in customer repertory database 215. Illustratively, the file comprises 20 numbers and associated speakerdependent HMMs with the corresponding customer ID number. An example of such a file is presented in FIG. 9. This file is then suitable for use by the telecommunication network-based repertory voice-dialing system to recognize spoken names and dial associated numbers, such as that presented in FIG. 10.

FIG. 10 resembles FIG. 5 all respects, except that HMMs representing the names of the called parties are stores in the customer repertory database 215 (shown in FIG. 9), rather than in a separate database 45. As such, the operation of the system of FIG. 10 is just like that of FIG. 5 except that the HMM of each called party name is compared to the set of vectors representing the spoken utterance to be recognized (rather than a sequence of phoneme HMMs being compared to the set of vectors). The comparison which yields the highest score identifies the spoken name. The called number corresponding to the HMM having the highest score is provided to switch 30 for use in generating signals used to complete a call to the identified called party.

D. Discussion

Although a number of specific embodiments of this invention have been shown and described herein, it is to be understood that these embodiments are merely illustrative of the many possible specific arrangements which can be devised in application of the principles of the invention. In light of this disclosure, numerous and varied other arrangements can be devised in accordance with these principles by those of ordinary skill in the art without departing from the spirit and scope of the invention.

One such alternative concerns the situation where a network user is but one of a plurality of users who make use of the network in the name of a user who is registered with the network. This situation occurs commonly is families where a telephone is registered to one family member but multiple family members (including the registered member) make use of that telephone. Regarding embodiments of the present invention where a person is asked to train the recognition system in a speaker dependent context (such as training a sequence of phonemes or whole word models), the voice response unit and script (prompting the training session) could be augmented to ask if the person on the line training is the person in the household who most often calls the named called party. If so, training for that called party can continue. Otherwise, training can either skip that called party name for training in a later session with the right person, or training can be suspended until the right person gets on the call to the training system. To effect skipping a name or suspending training, the script might be augmented by an initial question, such as:

Processor 28 (285): "Are you the person in the house who most frequently calls 'Daniel Furman'"?

An answer to this question in the negative would initiate a skip or suspension, which ever is appropriate for the system.

In the speaker-dependent contexts discussed above, multiple aliases could be created for a given called party. That is, the system could dial, e.g., Daniel Mayer's telephone number in response to the customer's saying "Daniel Mayer" or "Danny" or "Buddy." This could be done by modifying the training script to determine if the customer wishes to use any other name for a called party. If the answer to this question is yes, then training could proceed as discussed above for the new name (alias) for that party. Such new training could be represented in the repertory database as a new entry in the repertory with a new phonemic translation or set of models associated with the called number.

It would be possible to implement the principles of the present invention in a PBX which kept track of the telephone numbers dialed by PBX system users and which had as an adjunct speech recognition capability. In such case, it would be the PBX which would incorporate the database processor 5 of FIG. 1. Database 15 would be populated by information collected by the PBX while database 25 would be created and stored by the PBX in the same manner described above. Reverse telephone directory database 20 would have to be purchased or leased by a supplier, such as a LEC or an RBOC. The PBX would then take the place of network switch 30 in providing voice dialing service.

As discussed above, the creation and use of a customer repertory database depends in part on the ability to identify the customer so that customer usage records can be searched to create and identify the repertory for customer use. Although this has been discussed above in terms of customer ANI and billing records, it should be understood that alternative identification and records may be used. In addition or alternatively to the use of a conventional telephone customer billing record database in building a voice dialing repertory, a customer credit card database which includes records of telephone calls charged to the credit card could be used. In such a case, the customer's credit card number serves as the customer ID. Credit card information could be used instead of or in addition to billing record information. The use of a credit card information (records of calls charged to the card and credit card number) allows there to be a separate speed-dialing repertory for business and personal use, adding flexibility to meet customer needs.

Voice-dialing repertories can be updated in accordance with the present invention by the periodic reassessment of a customer's most frequently called numbers. This reassessment could be done once per year, for example. It would be accomplished as discussed above in the section addressing database training. An added feature would be that numbers common to old and new repertories would not need any further training interaction with the customer (for those embodiments which are speaker-dependent in some sense). Such a system would thus accomplish the elimination of infrequently called numbers during a given period, and the maintenance of numbers which are popular with the customer. The system thus "follows" the calling habits of the customer.

Correct usage of an embodiment of a voice dialing system in accordance with the present invention may be facilitated by use of the audio response system 35 in combination with the network switch 30 of FIG. 5. Such an audio response unit could announce the number or name being dialed (received from the speech recognition processor 40) in response to a recognized name spoken by the user. For example, if the user intends to call "Tom," but the speech recognition processor 40 recognizes "Mom" instead, the audio response system would announce to the customer a number or name the customer is not expecting. The customer, recognizing that he or she will be connected to the wrong party, can either hang-up and start again, or enter a special restart code, e.g., *#, which the switch 30 recognizes to (i) trigger the cancellation of dialing based on the previously recognized name and (ii) accept a new name for recognition from the customer.

When speech recognition processor 40 computes recognition scores for different vocabulary entries which are close, the likelihood of erroneous recognition increases. Therefore, interactive disambiguation of such closely scored vocabulary entries would be useful. This could be accomplished by speech recognition processor 40 which, when two or more scores satisfy some criterion of "closeness," signals the audio response system 35 to request that the customer repeat the desired name. With the name repeated, the recognition process is then repeated and new, perhaps less ambiguous scores, would be generated for use in recognition. Alternatively, the closely scored names could be spoken back to the customer by system 35 (as identified by system 40) along with an identified DTMF button to press for verification of the correct name.

The chance of disambiguation being necessary during recognition can be reduced somewhat by a modification of the speaker-dependent training processes. This modification avoids the use of names which will likely be scored too closely during recognition. This is done by speech training processor 95 (295) computing recognition scores of training speech (names) against all models for other vocabulary entries. When models yielding close scores (i.e., substantial acoustic similarity) for two or more names are encountered, audio response processor 85 (285) can prompt the customer to select different names for one or more of the closely scored names. The degree of tolerable acoustic similarity is a matter of system design constraints. It may be determined empirically based on error rates and may be expressed as a percent threshold (such as one score being within 5% of another).

The repertory database created from customer records is described above as used in the network to provide network based voice dialing. However, the present invention may be used in combination with a conventional telephone based recognizer. In such a situation, the repertory database 25 and the speech model database 45 (for example) could be downloaded into a memory into a telephone having conventional speech recognition software capability. Downloading could be accomplished using the data channel of an ISDN system, or using data modems and conventional telephone network interface hardware and software. The telephone-based recognition system would be conventional, however the repertory data would not since it is being collected from the network records in accordance with illustrative embodiments discussed above.

While embodiments discussed above presume the availability of a reverse telephone directory to provide name information associated with frequently dialed numbers, such information could be provided by other means. For example, it is discussed above that certain telephone numbers which are frequently dialed may be unlisted. In such circumstances it is possible to prompt the user to speak a name (a label) which is used to train an HMM or select a sequence of phonemes using automatic speech recognition techniques. Such a procedure could be employed for all frequently dialed numbers, thereby eliminating the need for the reverse directory.

The invention claimed is:

1. A method of training a speech recognition system for use in voice control of a telecommunication network by a network user for the purpose of providing a directory corresponding to the network user, the method comprising the steps of:

automatically analyzing network usage records representing the user's individual communication sessions to determine a network address to which the network user has frequently attempted to establish a communication path through the network;

determining a speakable label corresponding to the determined network address; and storing a representation of said label and corresponding address in a storage medium.

2. The method of claim 1 wherein said address comprises a telephone number.

3. The method of claim 1 wherein said network usage records comprise network billing records.

4. The method of claim 3 wherein said billing records comprise credit card billing records.

5. The method of claim 1 wherein said network comprises a telephone network and said network usage records comprise telephone network billing records.

6. The method of claim 1 wherein the step of determining a speakable label comprises the step of scanning a database to associate the determined network address with a speakable label.

7. The method of claim 6 wherein the database comprises a reverse telephone directory, the determined network address comprises a telephone number, and the speakable label comprises a name.

8. The method of claim 1 wherein the step of determining a speakable label comprises the step of querying the network user for the speakable label corresponding to the determined network address.

9. The method of claim 8 further comprising the step of comparing a first speakable label to a second speakable label to determine a measure of acoustic similarity of said labels and selectively querying the user to provide an alternative to said second label based on said measure of acoustic similarity.

10. The method of claim 1 wherein a plurality of persons uses the network in the name of a registered network user and wherein the step of determining a speakable label comprises the step of determining which person of the plurality makes a majority of attempts to establish a communication path to the determined network address.

11. The method of claim 10 further comprising the step of querying the determined person for the speakable label corresponding to the determined network address.

12. The method of claim 1 wherein the step of determining a speakable label is performed a plurality of times to determine a plurality of speakable labels for the determined network address.

13. The method of claim 1 wherein said representation of said label comprises a phonemic translation of said label.

14. The method of claim 1 wherein said representation of said label comprises at least one hidden Markov model.

15. The method of claim 1 further comprising the step of recognizing an utterance of the network user as one of a plurality of speakable labels stored in said storage medium.

16. The method of claim 15 further comprising the step of establishing a network connection between a communication device of the user and a communication device associated with a network address which corresponds to a recognized speakable label.

17. The method of claim 1 wherein the steps of the method are repeated over time to facilitate the storage of speakable labels and network addresses which reflect substantially current network usage.

18. The method of claim 1 wherein the network user is registered as a user of the network.

19. The method of claim 1 wherein the network user is a person who uses the network in the name of a registered network user.

20. The method of claim 1 further comprising the step of transmitting one or more stored representations of said labels and corresponding addresses to a network terminal.

21. The method of claim 20 wherein said network terminal comprises a telephone.

22. A system for training a speech recognition system for use in voice control of a telecommunication network by a network user for the purpose of providing a directory corresponding to the network user, the system comprising:

means, in said network, for automatically analyzing network usage records of the network user representing the user's individual communication sessions; to determine a network address to which the user has frequently attempted to establish a communication path through the network;

means for determining a speakable label corresponding to the determined network address; and means for storing a representation of said label and corresponding address.

23. The system of claim 22 wherein said address comprises a telephone number.

24. The system of claim 22 wherein said network usage records comprise network billing records.

25. The system of claim 24 wherein said billing records comprise credit card billing records.

26. The system of claim 22 wherein said network comprises a telephone network and said network usage records comprise telephone network billing records.

27. The system of claim 22 wherein the means for determining a speakable label comprises a means for scanning a database to associate the determined network address with a speakable label.

28. The system of claim 27 wherein the database comprises a reverse telephone directory, the determined network address comprises a telephone number, and the speakable label comprises a name.

29. The system of claim 22 wherein the means for determining a speakable label comprises a means for querying the network user for the speakable label corresponding to the determined network address.

30. The system of claim 22 wherein said representation of said label comprises a phonemic translation of said label.

31. The system of claim 22 wherein said representation of said label comprises at least one hidden Markov model.

32. The system of claim 22 further comprising means for recognizing an utterance of the network user as one of a plurality of speakable labels stored in said storage medium.

33. The system of claim 32 further comprising means for establishing a network connection between a communication device of the user and a communication device associated with a network address which corresponds to a recognized speakable label.

34. The system of claim 22 further comprising means for transmitting one or more stored representations of said labels and corresponding addresses to a network terminal.

35. A system for use in a telecommunications network, the system facilitating a network user's establishing a communication path through the network by voice control for the purpose of providing a directory corresponding to the network user, the system comprising:

a network user repertory database comprising stored representations of speakable labels and corresponding network addresses to which, as determined by automatic analysis of network usage records representing the user's individual communication sessions, the user has frequently attempted to establish communication;

a speech recognition processor, responsive to an utterance by said user, for recognizing said utterance as one of said representations of said speakable labels in said database; and means for generating control signals to establish a communication path through the network based on a network address corresponding to the recognized utterance.

36. The system of claim 35 wherein said address corresponding to the recognized utterance comprises a telephone number.

37. The system of claim 35 wherein said network usage records comprise network billing records.

38. The system of claim 37 wherein said billing records comprise credit card billing records.

39. The system of claim 35 wherein said network comprises a telephone network and said network usage records comprise telephone network billing records.

40. The system of claim 35 wherein each representation of said labels comprises a phonemic translation of said label.

41. The system of claim 35 wherein each representation of said labels comprises at least one hidden Markov model.

* * * * *